(12) United States Patent
Daniels

(10) Patent No.: US 8,608,533 B2
(45) Date of Patent: Dec. 17, 2013

(54) AUTOMATIC ROOF VENTILATION SYSTEM

(76) Inventor: Gregory S. Daniels, Santa Rosa, CA (US)

( * ) Notice: Subject to any disclaimer, the term of this patent is extended or adjusted under 35 U.S.C. 154(b) by 0 days.

(21) Appl. No.: 12/428,346

(22) Filed: Apr. 22, 2009

(65) Prior Publication Data

US 2009/0203308 A1  Aug. 13, 2009

Related U.S. Application Data

(62) Division of application No. 11/736,498, filed on Apr. 17, 2007, now abandoned.

(60) Provisional application No. 60/793,337, filed on Apr. 18, 2006.

(51) Int. Cl.
*F24F 7/02* (2006.01)

(52) U.S. Cl.
USPC .......................................... 454/250; 454/366

(58) Field of Classification Search
USPC ......... 454/365, 366, 367, 368, 343, 900, 260; 52/198, 199; 700/275; 236/51
See application file for complete search history.

(56) References Cited

U.S. PATENT DOCUMENTS

| | | | |
|---|---|---|---|
| 2,299,317 A | | 10/1942 | Fink |
| 2,638,835 A | * | 5/1953 | Strawsine ..................... 454/345 |
| 2,733,649 A | * | 2/1956 | LeBarron ..................... 454/239 |
| 3,027,090 A | * | 3/1962 | Zerhan, Jr. ..................... 236/49.5 |
| 3,376,164 A | | 4/1968 | Bachwansky |
| 3,658,596 A | | 4/1972 | Osborne |
| 3,951,336 A | * | 4/1976 | Miller et al. .................. 454/238 |
| 4,040,867 A | | 8/1977 | Forestieri et al. |
| 4,051,999 A | | 10/1977 | Granger et al. |
| 4,083,097 A | | 4/1978 | Anagnostou et al. |
| 4,097,308 A | | 6/1978 | Klein et al. |
| 4,189,881 A | | 2/1980 | Hawley |
| 4,201,121 A | | 5/1980 | Brandenburg, Jr. |
| 4,224,081 A | | 9/1980 | Kawamura et al. |

(Continued)

FOREIGN PATENT DOCUMENTS

| | | |
|---|---|---|
| DE | 198 23 356 | 11/1999 |
| GB | 2183819 | 6/1987 |

(Continued)

OTHER PUBLICATIONS

U.S. Office Action issued Dec. 18, 2007 in U.S. Appl. No. 11/736,498.

(Continued)

*Primary Examiner* — Steven B McAllister
*Assistant Examiner* — Helena Kosanovic
(74) *Attorney, Agent, or Firm* — Knobbe Martens Olson & Bear LLP

(57) ABSTRACT

A roof ventilation system operable based on environmental parameters is disclosed. The system includes a vent, a fan, a solar panel, a battery and a controller. The vent is positioned within a field of a roof, and includes a first opening configured to allow airflow between regions above and below the roof. The fan is positioned to generate an air flow through the vent. The solar panel is positioned on the roof in a location such that the solar panel receives solar radiation. The battery is electrically connected to the solar panel. The controller is in communication with the fan, and is configured to drive the fan based on at least one environmental parameter.

10 Claims, 11 Drawing Sheets

(56) References Cited

U.S. PATENT DOCUMENTS

| | | | | |
|---|---|---|---|---|
| 4,228,729 A | * | 10/1980 | Messick | 454/238 |
| 4,239,555 A | | 12/1980 | Scharlack et al. | |
| 4,251,026 A | | 2/1981 | Siegel et al. | |
| 4,314,548 A | | 2/1982 | Hanson | |
| 4,382,435 A | | 5/1983 | Brill-Edwards | |
| 4,383,129 A | | 5/1983 | Gupta et al. | |
| 4,432,273 A | | 2/1984 | Devitt | |
| 4,433,200 A | | 2/1984 | Jester et al. | |
| 4,574,160 A | | 3/1986 | Cull et al. | |
| 4,602,739 A | * | 7/1986 | Sutton, Jr. | 236/46 F |
| D285,829 S | | 9/1986 | Lock | |
| 4,625,469 A | | 12/1986 | Gentry et al. | |
| 4,633,769 A | | 1/1987 | Milks | |
| 4,651,805 A | | 3/1987 | Bergeron, Jr. | |
| 4,692,557 A | | 9/1987 | Samuelson et al. | |
| 4,759,272 A | | 7/1988 | Zaniewski | |
| 4,803,816 A | | 2/1989 | Klober | |
| 4,843,794 A | | 7/1989 | Holtgreve | |
| 4,850,166 A | | 7/1989 | Taylor | |
| 4,965,971 A | | 10/1990 | Jean-Jacques et al. | |
| 4,977,818 A | * | 12/1990 | Taylor et al. | 454/342 |
| 4,986,469 A | * | 1/1991 | Sutton, Jr. | 236/49.3 |
| 5,048,255 A | | 9/1991 | Gonzales | |
| 5,049,801 A | | 9/1991 | Potter | |
| 5,060,444 A | | 10/1991 | Paquette | |
| 5,078,047 A | | 1/1992 | Wimberly | |
| 5,131,200 A | | 7/1992 | McKinnon | |
| 5,131,888 A | | 7/1992 | Adkins, II | |
| 5,228,925 A | | 7/1993 | Nath et al. | |
| 5,232,518 A | | 8/1993 | Nath et al. | |
| 5,296,043 A | | 3/1994 | Kawakami et al. | |
| 5,316,592 A | | 5/1994 | Dinwoodie | |
| 5,333,783 A | * | 8/1994 | Catan | 236/13 |
| 5,364,026 A | | 11/1994 | Kundert | |
| 5,391,235 A | | 2/1995 | Inoue | |
| 5,480,494 A | | 1/1996 | Inoue | |
| 5,486,238 A | | 1/1996 | Nakagawa et al. | |
| 5,505,788 A | | 4/1996 | Dinwoodie | |
| 5,528,229 A | | 6/1996 | Mehta | |
| 5,620,368 A | * | 4/1997 | Bates et al. | 454/186 |
| 5,697,192 A | | 12/1997 | Inoue | |
| 5,706,617 A | | 1/1998 | Hirai et al. | |
| 5,722,887 A | | 3/1998 | Wolfson et al. | |
| 5,740,636 A | | 4/1998 | Archard | |
| 5,746,653 A | | 5/1998 | Palmer et al. | |
| 5,746,839 A | | 5/1998 | Dinwoodie | |
| 5,890,322 A | * | 4/1999 | Fears | 52/1 |
| 5,990,414 A | | 11/1999 | Posnansky | |
| 6,008,450 A | | 12/1999 | Ohtsuka et al. | |
| 6,036,102 A | | 3/2000 | Pearson | |
| 6,050,039 A | | 4/2000 | O'Hagin | |
| 6,051,774 A | | 4/2000 | Yoshida et al. | |
| 6,061,978 A | | 5/2000 | Dinwoodie et al. | |
| 6,077,159 A | | 6/2000 | Clayton | |
| 6,105,317 A | | 8/2000 | Tomiuchi et al. | |
| 6,129,628 A | | 10/2000 | O'Hagin et al. | |
| 6,155,006 A | | 12/2000 | Mimura et al. | |
| 6,220,956 B1 | * | 4/2001 | Kilian et al. | 454/239 |
| 6,241,602 B1 | | 6/2001 | Allen | |
| 6,242,685 B1 | | 6/2001 | Mizukami | |
| 6,243,995 B1 | | 6/2001 | Reeves et al. | |
| 6,294,724 B1 | | 9/2001 | Sasaoka et al. | |
| 6,306,030 B1 | | 10/2001 | Wilson | |
| 6,336,304 B1 | | 1/2002 | Mimura et al. | |
| 6,365,824 B1 | | 4/2002 | Nakazima et al. | |
| 6,415,559 B1 | | 7/2002 | Reeves et al. | |
| 6,418,678 B2 | | 7/2002 | Rotter | |
| 6,439,466 B2 | | 8/2002 | Fikes | |
| 6,447,390 B1 | | 9/2002 | O'Hagin | |
| 6,453,629 B1 | | 9/2002 | Nakazima et al. | |
| 6,491,579 B1 | | 12/2002 | O'Hagin | |
| 6,501,013 B1 | | 12/2002 | Dinwoodie | |
| 6,541,693 B2 | | 4/2003 | Takada et al. | |
| 6,606,830 B2 | | 8/2003 | Nagao et al. | |
| 6,695,692 B1 | | 2/2004 | York | |
| 6,799,742 B2 | | 10/2004 | Nakamura et al. | |
| 6,870,087 B1 | | 3/2005 | Gallagher | |
| 6,941,706 B2 | | 9/2005 | Austin et al. | |
| 7,053,294 B2 | | 5/2006 | Tuttle et al. | |
| 7,097,557 B2 | | 8/2006 | Kutschman | |
| 7,101,279 B2 | | 9/2006 | O'Hagin et al. | |
| 7,178,295 B2 | | 2/2007 | Dinwoodie | |
| D549,316 S | | 8/2007 | O'Hagin et al. | |
| 7,320,774 B2 | | 1/2008 | Simmons et al. | |
| 7,469,508 B2 | | 12/2008 | Ceria | |
| 7,497,774 B2 | | 3/2009 | Stevenson et al. | |
| 7,506,477 B2 | | 3/2009 | Flaherty et al. | |
| 7,507,151 B1 | | 3/2009 | Parker et al. | |
| 7,509,775 B2 | | 3/2009 | Flaherty et al. | |
| 7,531,740 B2 | | 5/2009 | Flaherty et al. | |
| 7,578,102 B2 | | 8/2009 | Banister | |
| 7,587,864 B2 | | 9/2009 | McCaskill et al. | |
| 7,642,449 B2 | | 1/2010 | Korman et al. | |
| 7,678,990 B2 | | 3/2010 | McCaskill et al. | |
| 7,736,940 B2 | | 6/2010 | Basol | |
| 8,079,898 B1 | | 12/2011 | Stevenson | |
| 2001/0027804 A1 | | 10/2001 | Inoue et al. | |
| 2003/0159802 A1 | | 8/2003 | Steneby et al. | |
| 2005/0191957 A1 | * | 9/2005 | Demetry et al. | 454/341 |
| 2005/0239393 A1 | * | 10/2005 | Reese | 454/251 |
| 2005/0239394 A1 | | 10/2005 | O'Hagin et al. | |
| 2006/0052047 A1 | * | 3/2006 | Daniels, II | 454/237 |
| 2007/0067063 A1 | * | 3/2007 | Ahmed | 700/275 |
| 2007/0072541 A1 | | 3/2007 | Daniels et al. | |
| 2007/0094953 A1 | | 5/2007 | Galeazzo et al. | |
| 2007/0207725 A1 | | 9/2007 | O'Hagin | |
| 2008/0220714 A1 | | 9/2008 | Caruso et al. | |
| 2010/0229940 A1 | | 9/2010 | Basol | |
| 2012/0110924 A1 | | 5/2012 | Makin | |

FOREIGN PATENT DOCUMENTS

| | | | | |
|---|---|---|---|---|
| GB | 2279453 | | 1/1995 | |
| GB | 2345536 | | 7/2000 | |
| JP | 59060138 | | 4/1984 | |
| JP | 59060138 A | * | 4/1984 | F24F 7/007 |
| JP | 06241517 | | 8/1994 | |
| JP | 06272920 | | 9/1994 | |
| JP | 09-158428 | | 6/1997 | |
| JP | 10061133 A | * | 3/1998 | E04D 13/16 |
| JP | 11044035 | | 2/1999 | |
| JP | 11-229576 | | 8/1999 | |
| JP | 2000274032 | | 10/2000 | |
| JP | 2004-092298 | | 3/2004 | |
| JP | 2007-534924 | | 11/2007 | |
| WO | WO 2005/108708 | | 11/2005 | |

OTHER PUBLICATIONS

U.S. Final Office Action issued Jul. 25, 2008 in U.S. Appl. No. 11/736,498.

U.S. Advisory Action issued Nov. 14, 2008 in U.S. Appl. No. 11/736,498.

U.S. Office Action issued Dec. 23, 2008 in U.S. Appl. No. 11/736,498.

Office Action received on Jul. 21, 2010 in U.S. Appl. No. 11/923,456.

Office Action mailed Jan. 22 2013 in Japanese Application No. 2011-509667, filed May 13, 2009.

* cited by examiner

AUTOMATIC ROOF VENTILATION SYSTEM

CLAIM FOR PRIORITY

This application is a divisional of and claims priority to U.S. patent application Ser. No. 11/736,498, filed Apr. 17, 2007, which is a non-provisional of and claims priority to U.S. provisional application No. 60/793,337, filed Apr. 18, 2006. The disclosures of the foregoing applications are hereby incorporated by reference in their entireties.

BACKGROUND OF THE INVENTION

1. Field of the Invention

This application relates generally to building ventilation and specifically to roof ventilation.

2. Description of the Related Art

Energy efficiency is a serious consideration in new home design. New homes require ways to minimize energy requirements to maintain comfortable living spaces. One of the most common energy losses in a home is due to heat transfer through the attic. In warm climates, heat builds up in the attic from solar energy incident on the roof. In colder climates, moisture builds up in the attic, robbing the insulation of much of its R value. Early efforts at minimizing the effects of heat and/or moisture build-up focused on insulation between the living space and the attic. Gable vents and dormer type passive ventilation systems have been incorporated to ventilate the attic. U.S. Pat. No. 6,050,039 to O'Hagin describes one such camouflaged passive ventilation system. However, this passive ventilation system does not teach a camouflaged active ventilation system.

In other systems, active grid-powered ventilation systems using gable vents and powered dormer type vents have been used to increase the ventilation of the attic. These grid-powered active ventilation systems require increased operation and installation costs compared with passive systems. In the southwest, many homes have low pitch, hip roofs which have no gables, and dormers may destroy the aesthetics of a design if improperly located or too numerous. Therefore, these systems have proven to be inadequate.

What is needed is an improved ventilation system that will minimally detrimentally affect the appearance of a building design if used in adequate numbers to properly ventilate the attic, and is applicable to many roof configurations and with many types of roofing materials, while offering low operation and installation costs relative to other active ventilation systems. In addition, there is a need to provide a ventilation system automatically operable based on varying environmental conditions with minimal energy consumption.

SUMMARY OF THE INVENTION

Preferred embodiments of the present invention provide a roof ventilation system which is operable based on varying environmental conditions with minimal energy consumption. In accordance with a preferred embodiment, a roof ventilation system is provided for a sloped roof having a ridge and an eave. The system comprises a first plurality of vents arranged generally linearly and positioned within the roof proximate one of the ridge and the eave. Each of the vents comprises a vent member comprising an opening that permits airflow between regions above and below the roof; and a fan configured to generate an air flow through the opening. In addition, the ventilation system includes a controller in communication with the fans of the vents. The controller is configured to drive the fans based on at least one environmental parameter.

In accordance with another preferred embodiment, a roof ventilation system is provided for a sloped roof having a ridge and an eave. The system comprises a first plurality of vents arranged generally linearly and positioned within the roof proximate the ridge. Each of the first plurality of vents comprises: a vent member comprising an opening that permits airflow between regions above and below the roof, and a fan configured to generate an air flow through the opening. The system also comprises a second plurality of vents arranged generally linearly and positioned within the roof proximate the eave. The second plurality of vents permits airflow between the regions above and below the roof. The second plurality of vents includes no fans. The system further comprises a controller in communication with the fans of the first plurality of vents. The controller is configured to drive the fans based on at least one environmental parameter.

In accordance with another preferred embodiment, a roof ventilation system is provided comprising a vent configured to be positioned within a field of a roof. The vent includes a first opening configured to allow airflow between regions above and below the roof. In addition, the ventilation system includes a fan configured to be positioned to generate an air flow through the vent, and a solar panel configured to be positioned on the roof in a location such that the solar panel receives solar radiation. The ventilation system also includes a battery configured to be electrically connected to the solar panel so that the solar panel charges the battery from solar radiation. The system is operated by a controller adapted to communicate with the fan. The controller is configured to drive the fan based on at least one environmental parameter.

In accordance with yet another preferred embodiment, a roof having a ventilation system is provided comprising: a roof comprising a layer of roof cover elements; and a vent configured to be positioned within the layer of roof cover elements. The vent includes a first opening configured to allow airflow between regions above and below the roof. The vent mimics an appearance of one or more of the roof cover elements. The system also comprises a fan configured to be positioned to generate an air flow through the vent; a solar panel configured to be positioned on the roof in a location such that the solar panel receives solar radiation; a battery configured to be electrically connected to the solar panel so that the solar panel charges the battery from solar radiation; and a controller adapted to communicate with the fan. The controller is configured to drive the fan based on at least one environmental parameter. The controller is configured to be powered by the battery.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figure, the invention not being limited to any particular preferred embodiment(s) disclosed.

DETAILED DESCRIPTION OF THE PREFERRED EMBODIMENT

Figure 1:
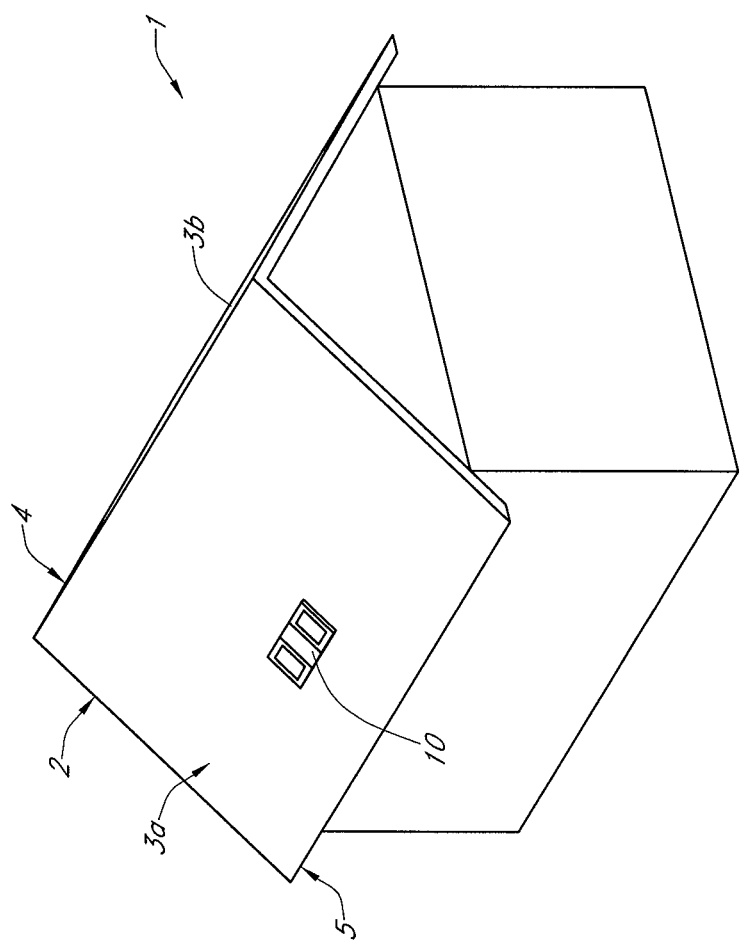
FIG. 1 is a perspective view of a vent positioned in a roof in accordance with one embodiment of the present invention.

FIG. 1 shows a building 1 with a roof 2 comprising two fields 3a and 3b that are joined at their upper ends to define a ridge 4. Lower edges 5 of the fields are referred to as an "eave." The fields 3a and 3b typically comprise a roof deck covered with roof cover elements such as tiles (e.g., clay or concrete), shingles (e.g., wooden, clay, or composition), or sheeting (e.g., metal). The illustrated roof is suitable for having one or more vents 10 according to one embodiment of the invention. Also, skilled artisans will appreciate that the vents may be provided in a wide variety of different types of roofs, including those not having ridges or sloped fields. In FIG. 1, the vent 10 is positioned on the central part of the field 3a. In other embodiments, the vent may be positioned on a different part of the field, depending on the ventilation needs.

Figure 2:
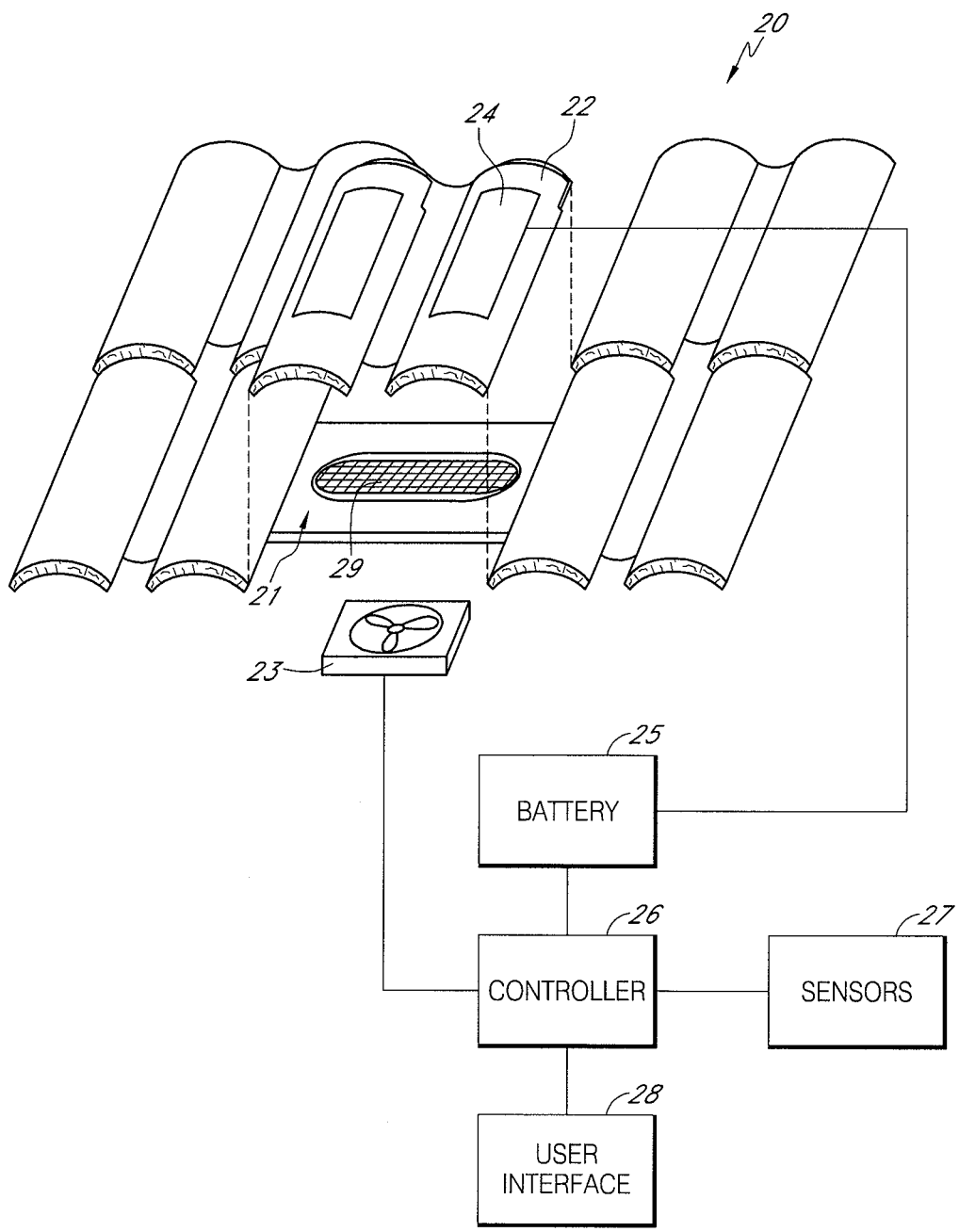
FIG. 2 is a schematic perspective view of one embodiment of a roof ventilation system.

FIG. 2 illustrates one embodiment of a roof ventilation system 20. The illustrated ventilation system 20 is positioned within a field of a tile roof. The illustrated ventilation system 20 includes a first vent member 21, a second vent member 22, a fan 23, a solar panel 24, a battery 25, a controller 26, one or more sensors 27, and a user interface 28. It will be appreciated that a plurality of ventilation systems 20 can be provided in one roof. Skilled artisans will also appreciate that a plurality of ventilation systems 20 can share a common battery 25, controller 26, sensors 27, and/or user interface 28.

The first vent member 21 is configured to be positioned at an opening in the roof. The first vent member 21 includes a vent opening 29 penetrating the first member 21. The vent opening 29 is configured to allow airflow between regions above and below the roof. The regions below the roof may include an attic or a living space of a building. The vent opening 29 is covered by a screen to prevent entry of insects, vermin, and debris larger than the screen openings.

The second vent member 22 is configured to reside above the first vent member 21, serving as a cap for the first vent member 21. The second vent member 22 also includes a vent opening (not shown) which is in fluid or ventilating communication with the vent opening 29 of the first vent member 21. This configuration allows airflow while preventing water or rain from entering the regions below the roof. Further details of the first and second vent members are disclosed in U.S. Pat. No. 6,050,039, the disclosure of which is incorporated herein by reference. In the illustrated embodiment, the second vent member 22 mimics an appearance of one or more of the roof cover elements (e.g., tiles, shingles, or sheeting).

The fan 23 is configured to generate airflow through the vent openings of the vent members 21 and 22. In the illustrated embodiment, the fan 23 is positioned in a region (for example, the attic) below the roof adjacent the vent opening 29 of the first vent member 21. The fan 23 is in line with the vent opening 29 to efficiently generate airflow through the vent opening 29. Preferably, the fan 23 includes a fan blade driven by a motor, both contained within a fan housing which is attached to the underside of the first vent member 21 by a fan adaptor (not shown). A skilled artisan will appreciate that the position and configuration of the fan 23 may be varied depending on the design of the ventilation system. For example, it may be possible to mount the fan 23 and its associated motor between the first and second vent members 21, 22.

The controller 26 is configured to drive the motor of the fan 23. The controller 26 is electrically connected to the fan 23. As will be later described, the controller 26 is configured to drive the fan 23 based on at least one environmental parameter. The controller preferably includes a CPU or microprocessor, a memory device, and other peripheral components so as to collect, process, store, and transmit electronic data.

The battery 25 is configured to supply power to the controller 26. The battery 25 is electrically connected to the controller 26. The battery 25 preferably serves as a main power source for the controller 26. In certain embodiments, an additional or auxiliary power source (not shown) may be provided to the controller 26. An exemplary additional power source is a domestic AC power source (e.g., from a municipal power grid). The domestic power source may be directly connected to the controller 26. In other embodiments, the domestic power source may be connected to the battery 25 to charge the battery 25 in case the solar panel 24 is not functional.

The solar panel 24 is configured to convert solar energy into electricity, and to supply the electricity to the battery 25 for storage. In the illustrated embodiment, the solar panel 24 is electrically connected to the battery. In certain embodiments, the solar panel 24 may be indirectly connected to the battery via the controller 26. The solar panel 24 is configured to be positioned on the roof in a location such that the solar panel receives solar radiation. The illustrated solar panel 24 is mounted on the second vent member 22. In other embodiments, the solar panel may be positioned at any suitable site on the roof. Preferably, the site is where the solar panel can effectively collect solar radiation. It will be appreciated that more than one solar panel can be associated with each ventilation system 20.

The one or more sensors 27 are configured to collect various environmental parameters on which the controller operation is based. Examples of environmental parameters include, but are not limited to, temperature, humidity, toxicity, moisture, precipitation, airflow, and ambient light level. In one embodiment, the environmental parameter comprises one or more selected from the group consisting of temperature, humidity, toxicity, moisture, air flow and ambient light level. The sensors 27 are configured to measure environmental parameters and convert the parameters into electronic data. Each of the sensors has means for measuring a respective environmental parameter. In addition, each of the sensors may further include a microprocessor, a memory, and peripheral components to collect, process, store, and transmit data to the controller 26.

Examples of the sensors include, but are not limited to, a temperature sensor, a humidity sensor, an air flow sensor, and a toxicity sensor. In certain embodiments, two or more of the sensors may be combined to provide measurements of multiple environmental parameters. The sensors 27 are all electrically connected to or adapted to communicate with the controller 26. The sensors may be powered by the battery via the controller or by another power source. The sensor positions will be later described with reference to FIG. 4.

The user interface 28 is configured to display measurements of the at least one environmental parameter collected from the sensors 27. The user interface 28 may also be configured to allow a user to control the fan via the controller 26. The user interface 28 includes a display device such as an LCD or CRT screen. Optionally, the user interface 28 may include an input device such as a touch pad screen and/or push buttons. In certain embodiments, the input device may be a key board or key pad. The user interface 28 is electrically connected to or adapted to communicate with the controller 26. In certain embodiments, the user interface 28 and the controller 26 may be integrated into one device.

Figure 3A:
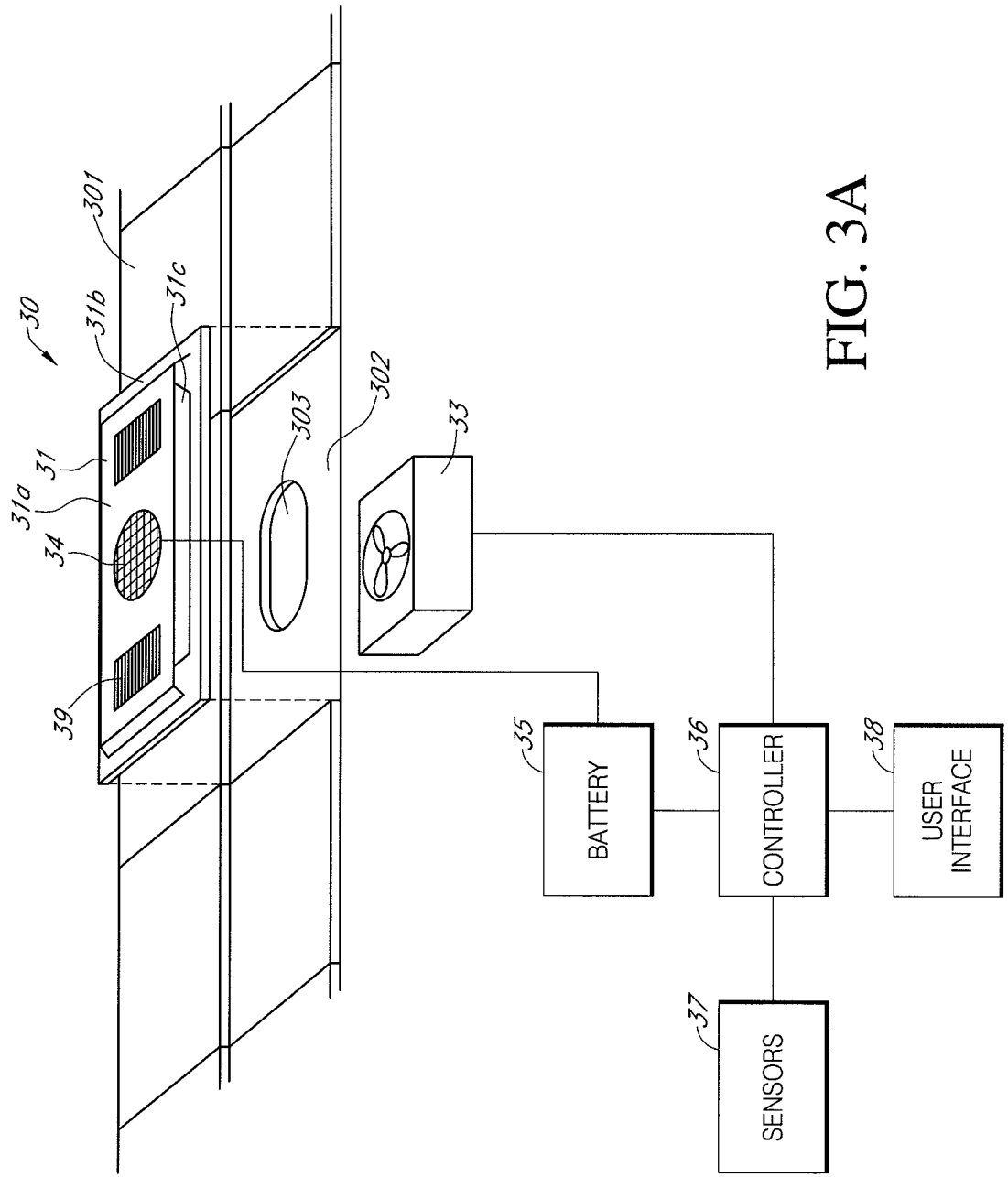
FIG. 3A is a schematic perspective view of another embodiment of a roof ventilation system.
Figure 3B:
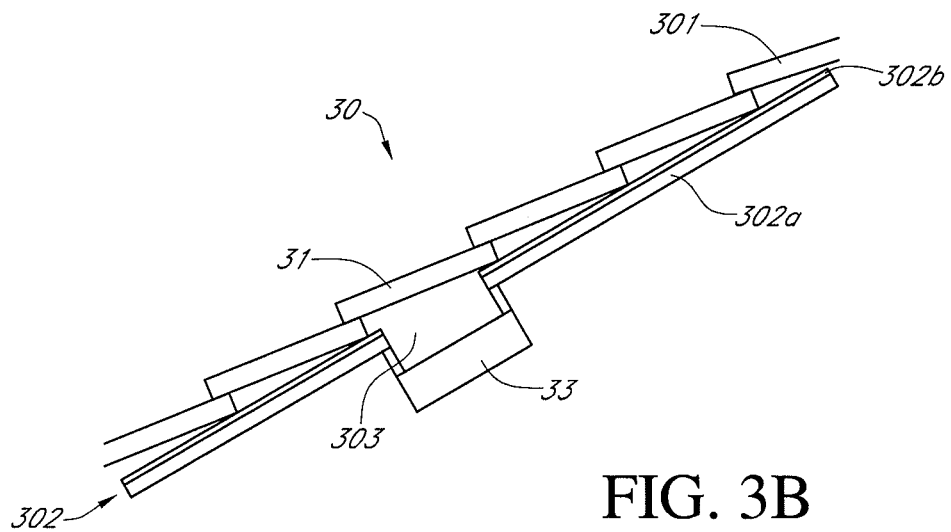
FIG. 3B is a schematic cross-sectional view of the roof ventilation system of FIG. 3A.

FIGS. 3A and 3B illustrate another embodiment of a ventilation system 30. The illustrated ventilation system 30 is positioned within a field of a roof covered by so-called composition shingles or roofing material 301. As shown in FIG. 3B, the roof has a roof deck 302 which may include a sheathing 302a and an underlay material 302b overlying the sheathing 302a. Typically, the sheathing 302a is formed of plywood, and the underlay material 302b is formed of tar. The composition shingles 301 are mounted on the underlay material 302b, as shown in FIG. 3B. The ventilation system 30 includes a vent member 31, a fan 33, a solar panel 34, a battery 35, a controller 36, one or more sensors 37, and a user interface 38. It will be appreciated that a plurality of ventilation systems 30 can be provided in one roof. Skilled artisans will also appreciate that a plurality of ventilation systems 30 can share a common battery 35, controller 36, sensors 37, and/or user interface 38.

The vent member 31 is configured to reside over an opening 303 in the roof deck 302. The vent member 31 includes an upper member 31a and a lower member 31b. The lower member 31b is mounted on the roof deck 302 (either on the sheathing 302a or on the underlay material 302b). The illustrated upper member 31a is configured to slightly protrude above the level of the top surfaces of the shingles 301. In addition, the upper member 31a has a flange 31c at its lower edge. The flange 31c may be configured to allow airflow underneath it to the opening 303 while preventing ingress of rain or snow. The vent member 31 includes one or more vent openings 39. The vent openings 39 are configured to allow airflow between regions above and below the roof. The illustrated vent openings 39 comprise louvers. A louver includes a number of narrow slits formed in parallel to each other. The slits, however, are not directly over the opening 303 in the roof. Yet, the vent openings 39 are configured to be in fluid or ventilating communication with the opening 303 of the roof by having space between the vent member 31 and the roof deck 302. This configuration allows ventilation while preventing water or rain from entering the regions below the roof. The vent member 31 also includes a solar panel 34 mounted on its upper surface.

Configurations and interconnections of the fan 33, the solar panel 34, the battery 35, the controller 36, the one or more sensors 37, and the user interface 38 are as described above with respect to FIG. 2.

Other types or configurations of roof vents may be suitable for being adapted to the ventilation systems of the present invention. Examples of such roof vents without limitation are shown and disclosed in U.S. Pat. Nos. 6,050,039; 6,129,628; 6,447,390; and 6,491,579; and U.S. Design patent application Ser. No. 29/195,520 filed on Dec. 11, 2003, the full disclosures of which are incorporated herein by reference.

A roof is designed to shed rain and snow and shield the living space from sun. A roof is composed of structural elements to support its weight and form a slope to assist in shedding rain and snow.

Figure 8A:
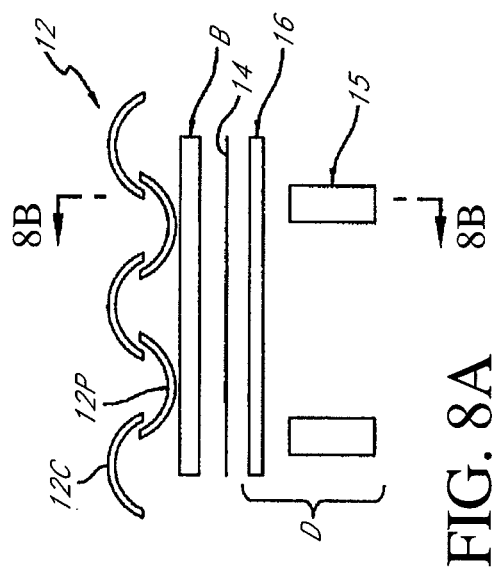
FIG. 8A is an exploded end view of the component parts of a conventional tile roof.
Figure 8B:
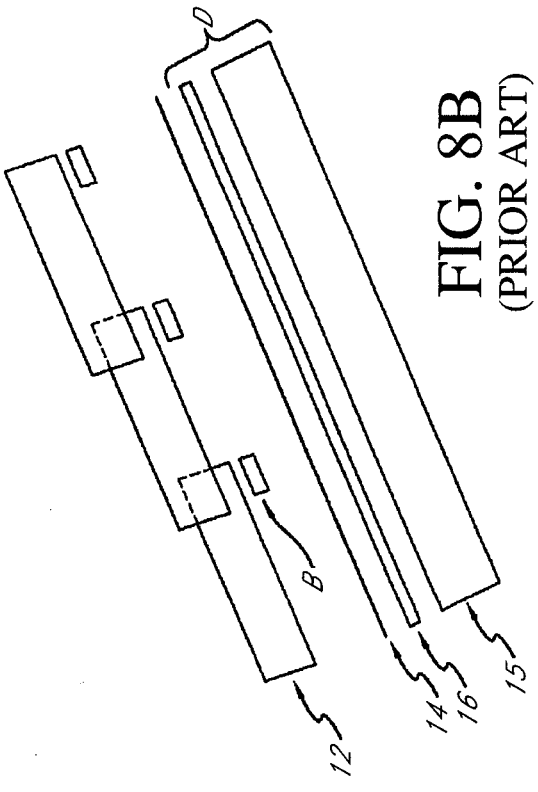
FIG. 8B is a side view of the roof of FIG. 8A, taken along 8B-8B.

The first structural element is the roof rafter 15 or truss which creates the basic slope of the roof as shown in FIGS. 8A and 8B. Secured on top of the rafters or trusses, such as rafter 15, is a layer of wood 16, such as planks, plywood or oriented strand board (OSB). Nailing plywood 16 to the roof rafters forms a sloped diaphragm or structural layer D.

Structural layer D forms a very strong structural element and is likely to leak only along the seams between sheets of plywood 16 if left as the complete roof. However, wood requires frequent attention and treatment to retain its weather resistance, and thus is not a good long term roof material.

Plywood 16 is usually covered with lapped layers of roofing felt 14 or paper or other suitable material which is treated with tar and/or other chemicals to render it water resistant. The lapped layers of felt 14 may become sealed together by the heat on the roof and form a true water proof membrane or layer and could be used for a roof topping. However conventional roof felt or paper such as felt 14 is fairly fragile and susceptible to damage from sun or wind. If left unshielded in the sun it would dry and crack in a short time and thus is inadequate as a lone weatherproofing material.

By covering felt 14 with a layer of material resistant to sun and other weather effects, felt 14 may be protected from direct solar radiation and may produce a weather-tight roof. Layer 12 may be composed of asphalt shingles, wood shingles, clay tiles, concrete tiles, metal tiles or similar conventional materials. In this example, layer 12 is composed of interleaved clay tiles such as cap tiles 12C and pan tiles 12P. Battens, such as batten B, may be used as securing sites for metal, clay or concrete tile roofs.

Layer 12 sheds the majority of rain and snow and is generally impervious to long term weather effects. Layer 12 does have many small openings and spaces between the tiles or other elements, thus felt 14 remains as the waterproof layer and sheds any water or snow which passes through layer 12.

Figure 8C:
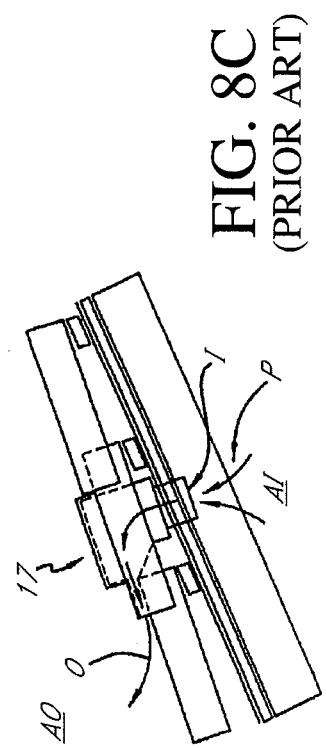
FIG. 8C is a side view of a conventional closed system vent installed on a tile roof.

Referring now to FIG. 8C, conventional camouflaged vents, such as vent 17, provide a direct and closed conduction path P for attic air or waste vent air. In a passive ventilation system, the volume of air conducted via path P is limited by the cross sections at opening O and inlet I and the temperature differential between the air AI in the attic and air AO outside the attic. To permit adequate attic ventilation, many conventional vents, such as vent 17, will be needed. Due to the directness of path P, wind driven rain or snow may be blown into opening O and travel directly into the underlying attic space bypassing tile layer 12 and water proof felt layer 14.

Due to the complex shapes required, conventional camouflaged vents, such as vent 17 are often fabricated from moldable materials such as plastics. Plastic permits a vent to survive moisture yet may not be as durable as conventional roofing materials due to the effects of solar radiation and/or airborne chemicals.

Figure 9:
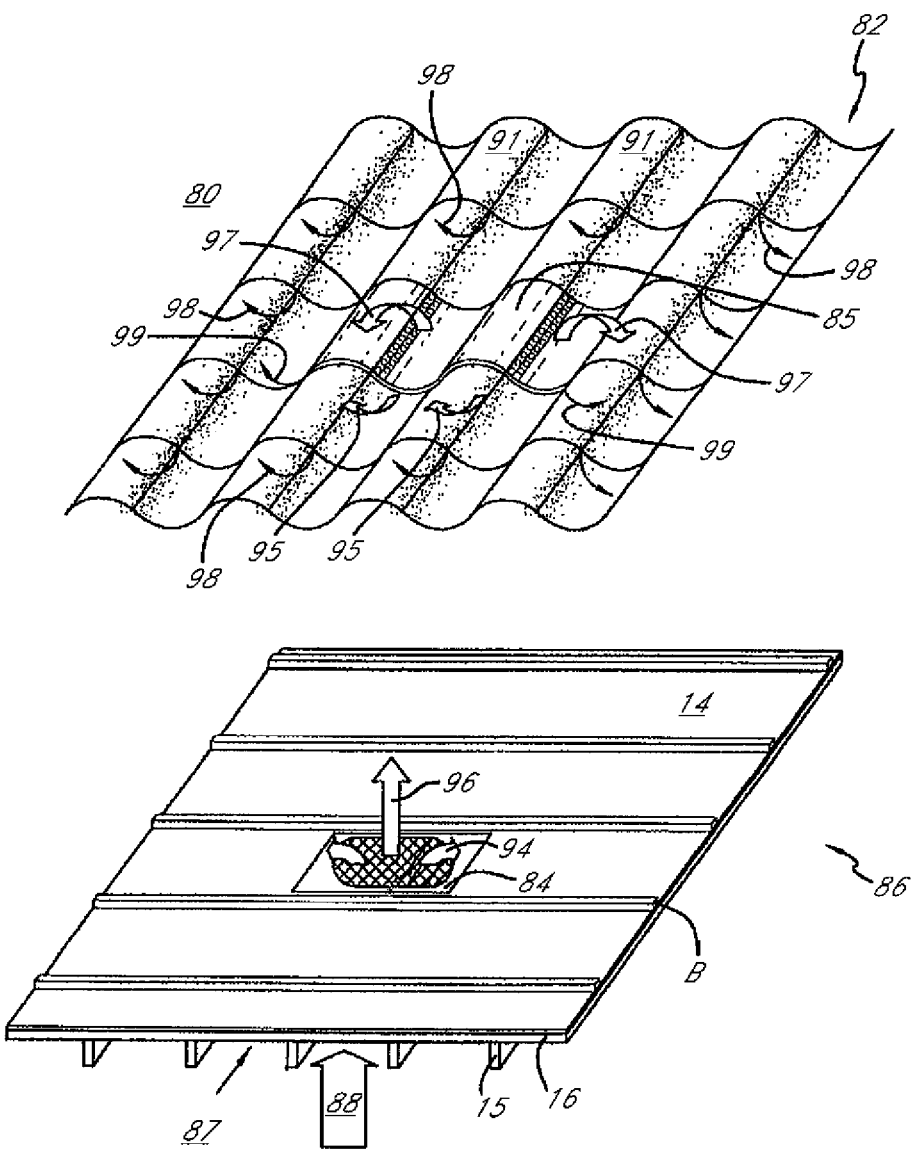
FIG. 9 is an expanded isometric view of a section of roof according to the present invention.

Referring now to FIG. 9, new roof system 80 is shown according to a currently preferred embodiment of the present invention. Roof system 80 includes roof shield layer 82 and one or more primary vents such as primary vent 84. Roof system 80 may be installed on any conventional water resistant roof layer such as roof structural layer 86. Roof shield layer 82 may be composed of conventional, solid tiles such as tiles 91, or a combination of solid tiles and hollow structural tiles such as tile 85. Conventional tiles 91 may be produced from any suitable material such as clay concrete, slate, or metal.

Figure 10:
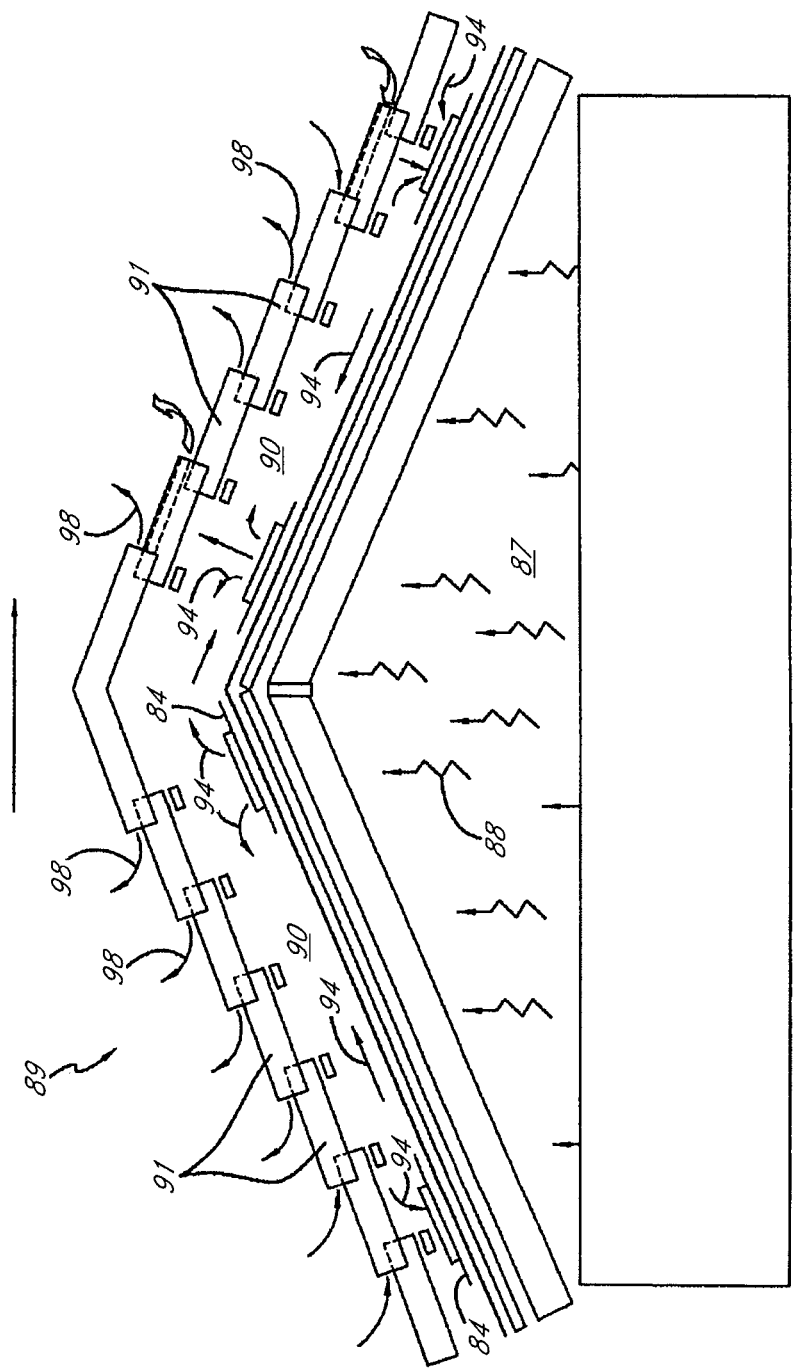
FIG. 10 is a partially exploded section view of a roof according to the present invention.

Referring now to FIG. 10, attic air 88 may be drawn through one or more primary vents such as primary vent 84 by a pressure or temperature differential between attic or enclosed airspace 87 and outside airspace 89. Once attic air 88 is drawn through primary vent 84 it enters a ventilation layer or twining chamber 90. In an embodiment of the present invention, outbound primary ventilation flow 94 passes through roof shield layer 82 as exhaust air 98 to complete attic ventilation. It should be noted that this discussion focuses on an outbound flow of air, but similar pathways and dynamics exist for an inbound flow of air.

In this embodiment of the invention, roof shield layer 82 is formed of tiles or other suitable roof shield elements that are disposed with respect to one another so as to cover structural layer 86 and protect it from the effects of weather, and also to provide air flow passages between the tiles to allow air flow into and out of ventilation layer 90. Thus, in one embodiment of the invention each tile 91 is disposed with the downslope edge overlying the upslope edge of the adjacent downslope tile, in a manner well known in the art, and spaced from the upslope edge of the adjacent tile by a sufficient distance to create an air flow passage therethrough. The distance between overlapping edges of adjacent tiles need not be great, as the combined effect of such air flow passages over the entire surface of roof shield layer 82 can be significant. Therefore merely providing cracks between overlapping tile edges may be enough to effectuate a combined venting performance sufficient to effectively exhaust any air 88 pushed through from, or sucked into, attic 87. Additionally, roofs will typically not be sealed around their edges, and these edges will therefore also act as air flow passages to and from ventilation layer 90. The term "venting performance" as used above and in the claims is understood to encompass any measure or definition of air flow, including but not limited to a measure of the effective or total cross sectional area, the effective air flow volume, or the effective air flow speed.

In another embodiment of the present invention, roof shield layer 82 may include hollow vent tiles such as tile 85 to improve the efficiency of ventilation. As air 88 is drawn out through primary vent 84 it may be diverted by tiles 91 or one or more diverters such as frame diverters. Diverters divide attic air 88 into twining or primary flow 94 and secondary flow 96. Primary flow 94 circulates within ventilation layer 90 and is exhausted as exhaust air 98 through the cracks or openings provided over the entirety of roof shield layer 82, as detailed above. With reference once again to FIG. 9, secondary flow 96 is directed through any generally co-located secondary structural tiles such as tile 85 to exhaust through the sides as side air 99, through the front as front air 95, or through the top as top air 97. Thus the total air exhausted from attic 87 may be expressed as TA and is shown in equation 100.

$$100 \rightarrow T_A = \text{(secondary flow 96)} + \text{primary flow 94}$$
$$= \text{(top air 97 + front air 95 + side air 99)} + \text{exhaust air 98}$$

Figure 11:
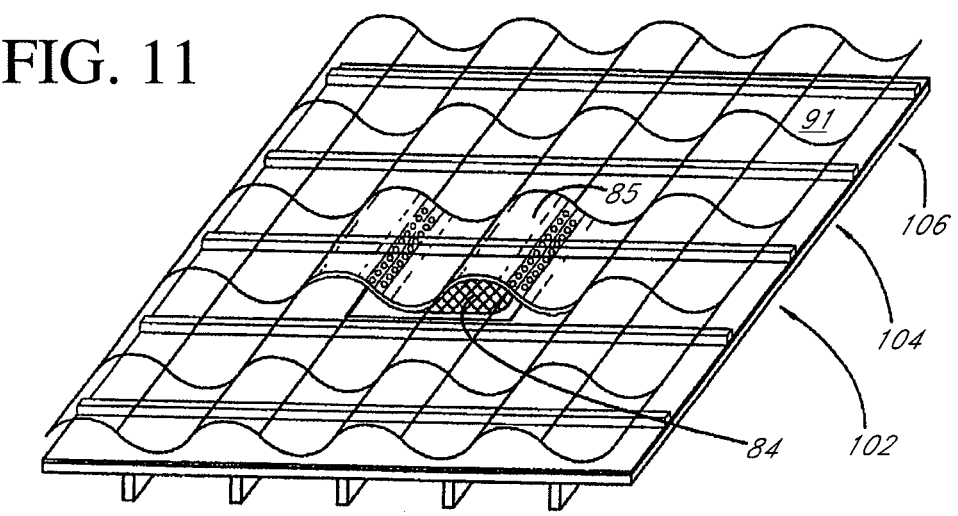
FIG. 11 is a condensed isometric view of the roof of FIG. 9.

Referring now to FIG. 11, roof shield layer 82 is shown directly connected to structural layer 86. Vent tile 85 may be located above any primary vent 84 as shown in FIG. 11 to prevent a broken tile directly above a primary vent from allowing water to pass directly through into enclosed space or attic 87. Conventional tiles 91 adjacent to tile 85 are shown as clear to permit a view of the installed interrelationship between the elements of roof shield layer 82 and the elements of structural layer 86. Primary vent 84 is shown installed directly below vent tile 85. To exploit the ventilation efficiency of the present invention, vent tile 85 may be installed in any of the illustrated locations of row 102, row 104, or row 106, and thus take advantage of the natural updraft created by rising attic air 88, which will typically be warmer than outside airspace 89.

In one aspect of the present invention, a ventilated roof includes a first roofing layer having a primary vent through which air from an attic is to be ventilated; and a second roofing layer constructed from a plurality of similar roofing tile elements disposed over the first roofing layer and having an effective third vent in air flow communication with the primary vent to vent said attic, said effective third vent combining air flow passages between the tile elements; and a secondary vent disposed in the second roofing layer and including an airflow passage therethrough so that the effective third vent combines the air flow passages between the tile elements with the air flow passage through the secondary vent.

Figure 4:
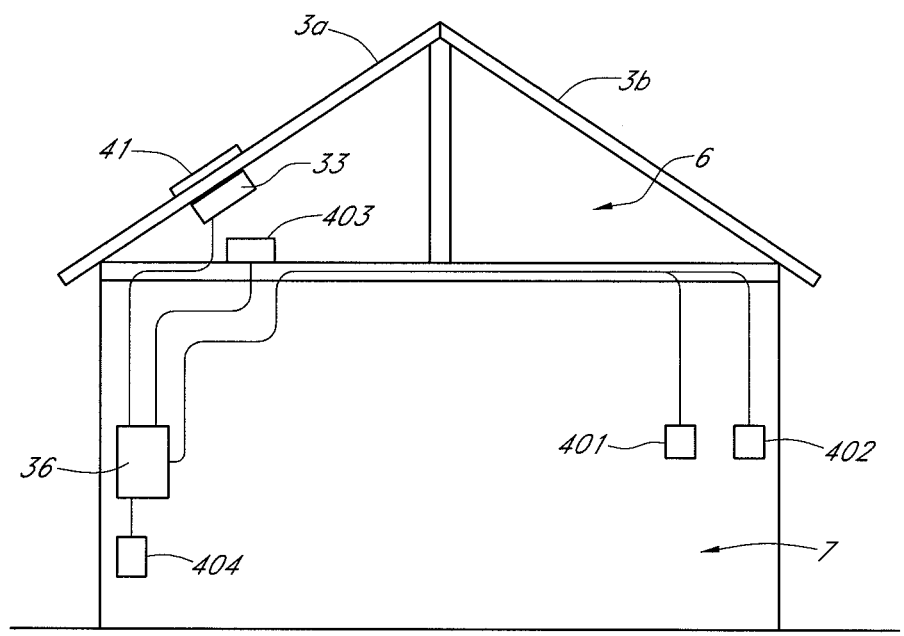
FIG. 4 is a schematic cross-sectional view of a roof ventilation system which shows sensor locations.

FIG. 4 illustrates the positions of the sensors of FIG. 2 or 3 according to one embodiment. In the illustrated embodiment, a temperature sensor 401 is positioned in a living space 7. In addition, a humidity sensor 402 and a toxicity sensor 404 are also positioned in the living space 7 at a suitable level and location. An airflow sensor 403 is positioned in an attic 6 to monitor airflow near a roof vent 31. In other embodiments, the sensors may be positioned at different locations. In addition, two or more sensors of the same type may be provided at several different locations. Any of a wide variety of different combinations and types of sensors can be provided.

Figure 5:
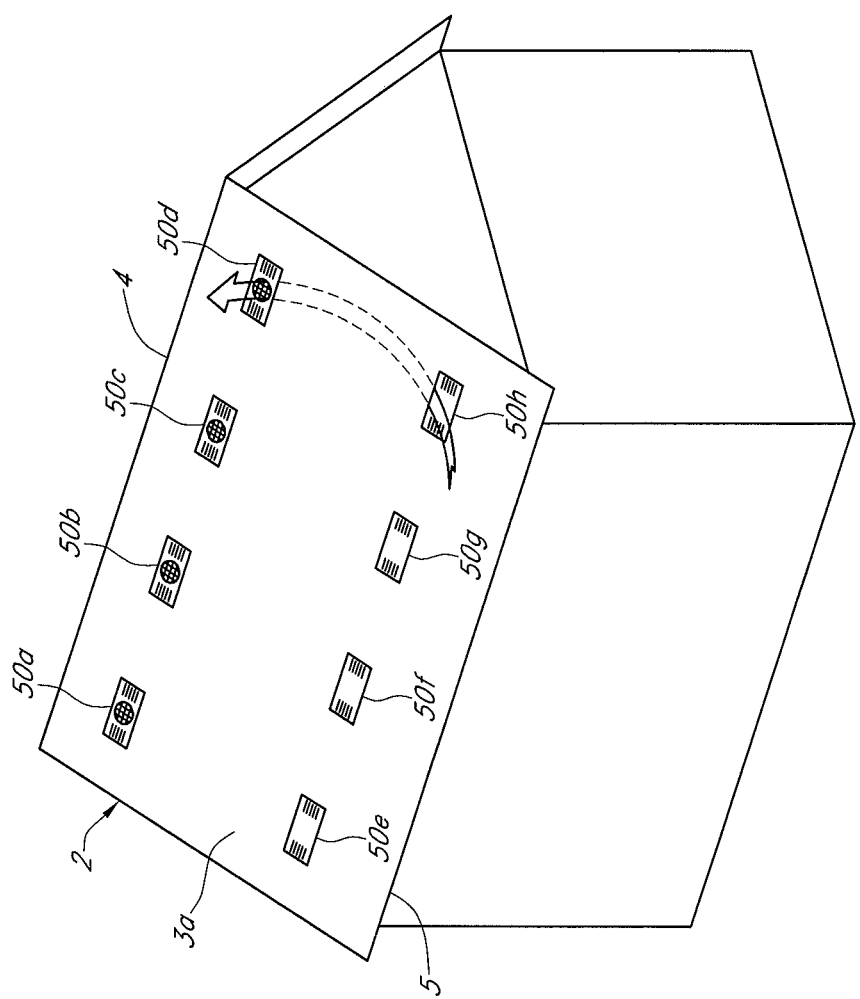
FIG. 5 is a perspective view of another embodiment of a roof ventilation system having a plurality of vents.

FIG. 5 illustrates another embodiment of a ventilation system including a plurality of vents. The illustrated ventilation system is suitable for a sloped roof 2 having a ridge 4 and an eave 5. In certain embodiments, the ventilation system may be modified for various other types of roofs. The ventilation system includes a first plurality of vents 50a-50d arranged generally linearly. The first plurality of vents 50a-50d are positioned within the roof 2 proximate the ridge 4. The ventilation system also includes a second plurality of vents 50e-50h arranged generally linearly and positioned within the roof 2 proximate the eave 5. The second plurality of vents 50e-50h are arranged generally along a line that is generally parallel to a line along which the first plurality of vents 50a-50d are generally arranged.

Each of the first plurality of vents 50a-50d includes a vent member having an opening that permits airflow between regions above and below the roof. Each of the vents 50a-50d also includes a fan configured to generate airflow through the opening, and a solar panel positioned to receive solar radiation. The configurations of the vents 50a-50d may be as described above with respect to FIG. 2 or 3, but other configurations are also possible.

Each of the second plurality of vents 50e-50h is configured to permit airflow between the regions above and below the roof. Optionally, the second plurality of vents 50e-50h may have the same configuration as that of the first plurality of vents 50a-50d either with or without fans.

The ventilation system is configured to generate airflow to enter the second plurality of vents 50e-50h and to exit the first plurality of vents 50a-50d, as denoted by an arrow in FIG. 5. This configuration can be achieved by generating outward airflow using the fans of the first plurality of vents 50a-50d. In a preferred embodiment, the vents 50e-50h do not include fans. In an alternative embodiment, the airflow may be enhanced by generating inward airflow with fans associated with the second plurality of vents 50e-50h. In this alternative, the fans of the second plurality of vents 50e-50h preferably either spin in an opposite direction to the fans 50a-50d or have an inverse curvature of the fan blades.

Figure 6:
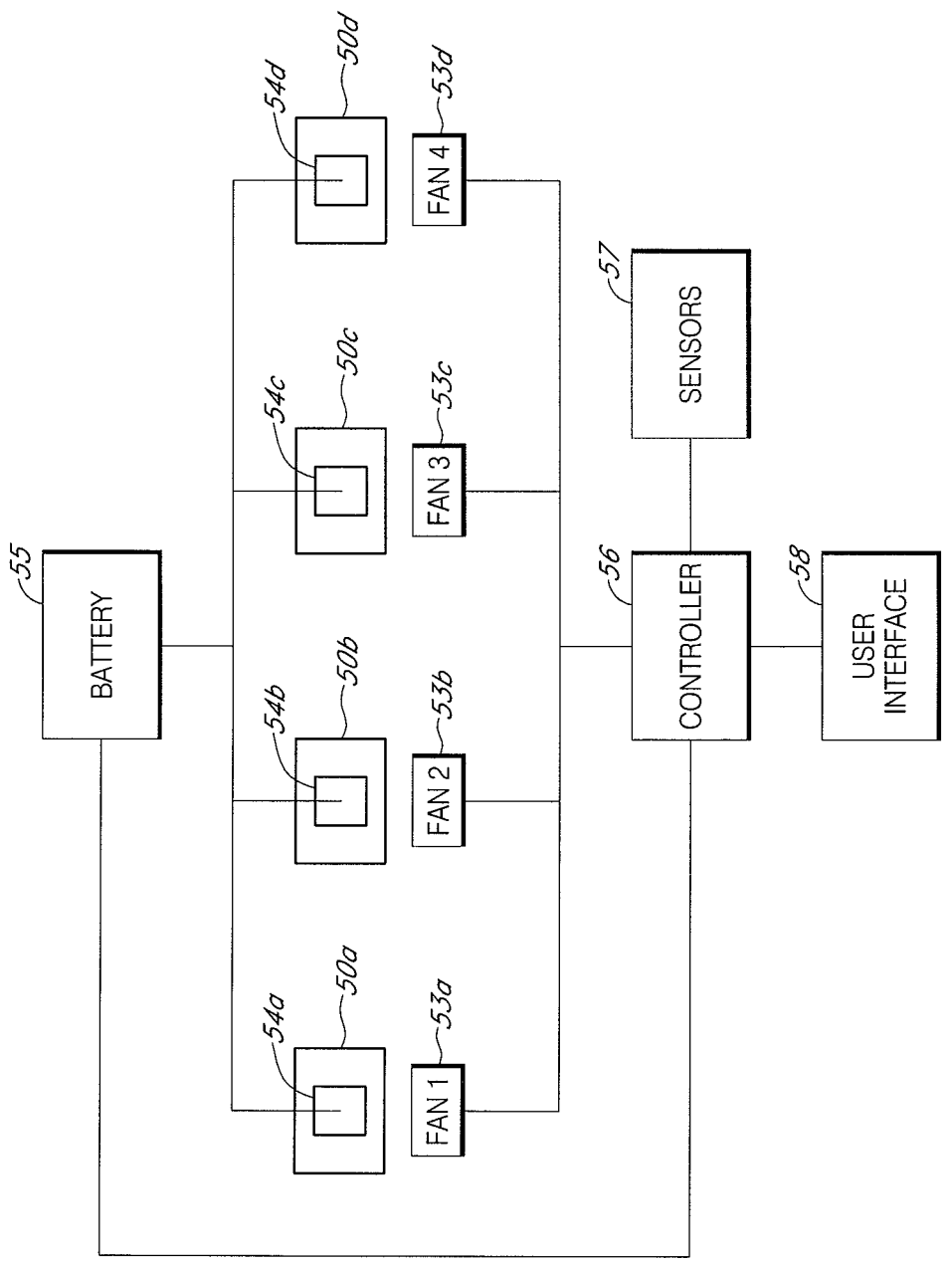
FIG. 6 is a schematic diagram of the roof ventilation system of FIG. 5.

FIG. 6 illustrates a schematic diagram of the ventilation system of FIG. 5. The ventilation system includes the plurality of first vents 50a-50d, the plurality of second vents 50e-50h (not shown), a plurality of fans 53a-53d, a plurality of solar panels 54a-54b, a battery 55, a controller 56, one or more of sensors 57, and a user interface 58.

Each of the first vents 50a-50d is provided with a fan and a solar panel. The solar panels may be mounted on the vents or the cover members of the vents as described with respect to FIG. 2 or 3. Although not shown, each of the second plurality of vents 50e-50h may be provided with a fan and/or a solar panel.

The battery 55 is configured to supply power to the controller, and is electrically connected to the solar panels of the vents 50a-50d. The illustrated system includes only one battery. In certain embodiments, however, the system may have back-up batteries.

The controller 56 is configured to be in electrical communication with the fans 53a-53d of the vents 50a-50d. The controller 56 is configured to drive the fans based on at least one environmental parameter as described above with respect to FIG. 2. Examples of environmental parameters include, but are not limited to, temperature, humidity, precipitation, toxicity, moisture, air flow, and ambient light level. The controller 56 is configured to collect environmental parameter data from the sensors 57, and drive the fans 53a-53d based on the data.

In one embodiment, the controller 56 is configured to operate on a software program for providing optimal ventilation. The program first determines whether the environmental parameters are within predetermined ranges. If not, the program instructs the controller 56 to drive the fans 53a-53d. In certain embodiments, the program may turn on some of the fans while turning off the others. In other embodiments, the program may control the speed of each fan. The configurations of the sensors 57 and the user interface 58 are as described above with respect to FIGS. 2 and 4.

Figure 7:
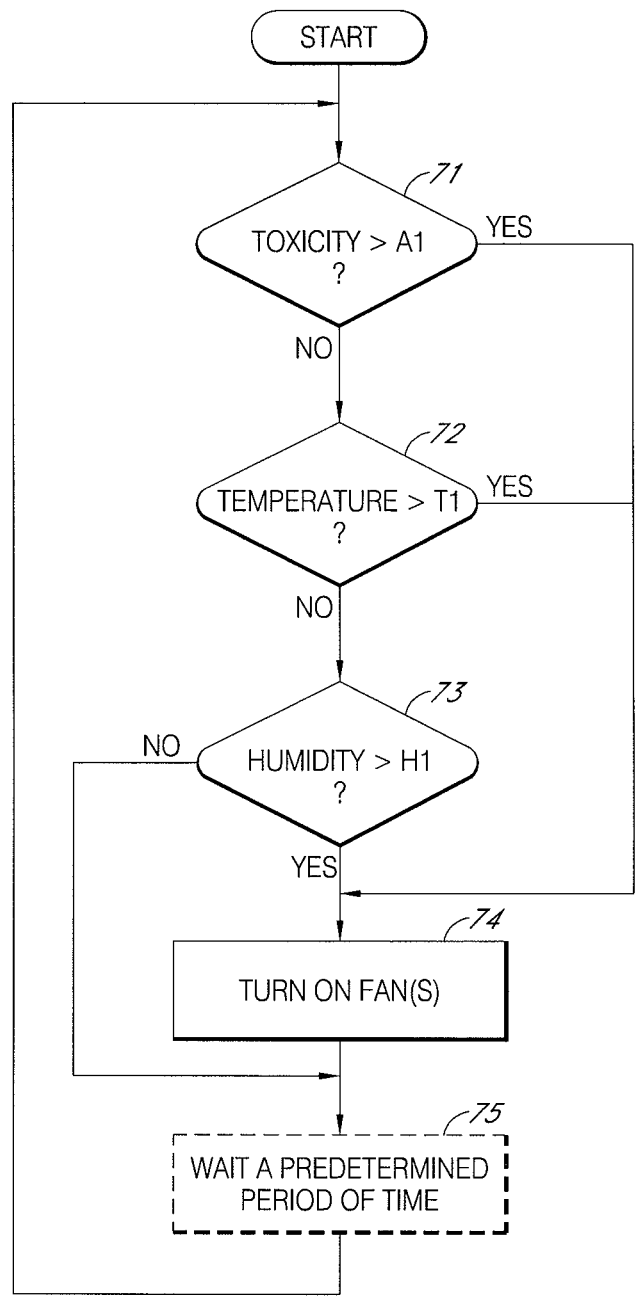
FIG. 7 is a flowchart illustrating an exemplary operation of a roof ventilation system.

FIG. 7 is a flowchart illustrating an exemplary operation of any one of the roof ventilation systems of the embodiments described above. It should be understood that FIG. 7 illustrates one embodiment of a control system, and that many alternative embodiments are possible. The system can operate on a prioritized determination scheme based on two or more environmental parameters. In the illustrated example, the system operates based on measurements of toxicity, temperature, and humidity. In other examples, other environmental parameters can be used (either in place of or in addition to those of FIG. 7) for the ventilation control. Alternatively, a subset of the parameters shown in FIG. 7, possibly in addition to one or more other parameters not shown in FIG. 7, can be used for the ventilation control. In the flowchart, some blocks can be omitted. In addition, two or more blocks can be combined with one another.

In block 71, the controller of the system receives toxicity data from a toxicity sensor positioned preferably in a living space. The controller determines whether the airborne concentration of a toxic gas is above a predetermined level A1. An exemplary toxic gas is carbon monoxide (CO). The predetermined level for carbon monoxide (CO) can be set to, for example, 35 PPM, the limit allowed by the U.S. Occupational Safety and Health Administration (OSHA). In one embodiment, the system does not allow a user to adjust the predetermined level. In another embodiment, the system allows the adjustment of the predetermined level. If the airborne concentration of the toxic gas is above the predetermined level A1, the controller turns on a fan at block 74. In an embodiment in which the system includes a plurality of fans, the controller can turn on two or more fans for effective removal of the toxic gas.

If the airborne concentration is below the predetermined level A1, the controller preferably determines whether the current temperature of the attic or living space is above a predetermined temperature T1 (block 72). If yes, the controller preferably turns on the fan(s). If no, the controller preferably determines whether the current humidity exceeds a predetermined humidity level H1 (block 73). For example, the predetermined humidity level can be 35% RH. The predetermined toxicity level A1, temperature T1, and humidity level H1 can be adjusted using a user interface. In other embodiments in which other parameters are used for the ventilation control, the predetermined levels of the other parameters can also be adjusted using a user interface. If the current humidity exceeds the predetermined humidity level H1, the controller turns on the fan(s). If not, the process goes to block 75, in which the controller waits a predetermined period of time before restarting the entire process. Similarly, the controller can, in one embodiment, only turn on the fan(s) for a predetermined period of time at block 74, and wait at block 75 before restarting the process. The block 75 can be omitted in certain embodiments. It will be understood that the control of the fans may be based on the outcome of various different logical and/or mathematical formulae involving the sensed environmental parameters. FIG. 7 is just one example of such.

This configuration allows the system to save power while achieving optimal conditions for an attic and/or living space. The controller can also control the speed of the fan(s) depending on needs. These configurations are particularly useful when the system is powered only by solar energy and not by a municipal power grid. A skilled artisan will appreciate that various other algorithms can be provided for suitable ventilation.

In certain embodiments, any of the roof ventilation systems described above can be combined with a central air conditioning system of a house or building. The roof ventilation system can enhance the efficiency of air conditioning by removing heat build-up from an attic space. In the embodiments described above, the roof ventilation system can be powered by solar energy, and thus can effectively reduce overall energy consumption in climate control of a house or building. The roof ventilation system also helps to more efficiently comply with regulations on indoor air quality such as ASHRAE (The American Society of Heating, Refrigerating and Air-Conditioning Engineers) Standard 62-1989 (or similar later provisions), OSHA proposed regulations on indoor air quality, and OSHA general regulation (29 CFR 1910).

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

What is claimed is:

1. A roof ventilation system for a sloped roof of a building, the roof having a ridge and an eave, the system comprising:
    a first roofing layer;
    a second roofing layer constructed from a plurality of similar roofing tile elements disposed over the first roofing layer to form an air gap that extends between the first and second roofing layers substantially from the ridge to the eave;
    a first plurality of at least three vents arranged generally linearly and positioned within the roof proximate the ridge, each vent of the first plurality of vents comprising:
        a primary vent member positioned within the first roofing layer and comprising an opening that permits airflow between the air gap above the first roofing layer and an attic region below the first roofing layer,
        a fan configured to generate an exhaust air flow through the opening from the attic region below the first roofing layer to a region above the second roofing layer, and
        a secondary vent member positioned within the second roofing layer, and in air flow communication with the primary vent member through the air gap, the secondary vent member allowing airflow between the air gap and the region above the second roofing layer;
    a second plurality of at least three vents arranged generally linearly and positioned within the roof proximate the eave, each vent of the second plurality of vents comprising:
        a primary vent member positioned within the first roofing layer and comprising an opening that permits airflow between the air gap above the first roofing layer and the attic region below the first roofing layer,
        a fan configured to generate an inward air flow through the opening from the region above the second roofing layer to the attic region below the first roofing layer, and
        a secondary vent member positioned within the second roofing layer, and in air flow communication with the primary vent member through the air gap, the secondary vent member allowing airflow between the air gap and the region above the second roofing layer; and
    a controller in communication with the fans of the first and/or second plurality of vents, the controller being configured to drive the fans based on at least two types of environmental parameter, so that the fans of the first plurality of vents produce said exhaust airflow and so that the fans of the second plurality of vents produce said inward airflow.

2. The system of claim 1, wherein at least some of the vents further comprise solar panels positioned to receive solar radiation for powering at least some of the fans.

3. The system of claim 2, further comprising a battery electrically connected to the solar panels of the first plurality of vents.

4. A ventilated roof of a building, the roof having a ridge and an eave, comprising:
    a first roofing layer;
    a second roofing layer constructed from a plurality of similar roofing tile elements disposed over the first roofing layer to form an air gap between the first and second roofing layers;
    a first plurality of at least three vents arranged generally linearly and positioned within the roof proximate the ridge, wherein each vent of the first plurality of vents includes a fan positioned to generate an air flow through the vent;
    a second plurality of at least three vents arranged generally linearly and positioned within the roof proximate the eave, wherein each vent of the first and second pluralities of vents comprises:
        a primary vent member positioned within the first roofing layer, the primary vent member comprising an opening that permits airflow between an attic and the air gap; and
        a secondary vent member positioned within the second roofing layer, and in air flow communication with the primary vent member through the air gap, the secondary vent member allowing airflow between the air gap and a region above the roof, wherein said second roofing layer includes air flow passages between the tile elements;
    a solar panel positioned in a location such that the solar panel receives solar radiation;
    a battery electrically connected to the solar panel so that the solar panel charges the battery from solar radiation; and
    a controller adapted to communicate with one or more of the fans, the controller being configured to:
        receive a toxicity value and determine whether the toxicity value exceeds a toxicity threshold;
        receive a temperature value and determine whether the temperature value exceeds a temperature threshold;
        receive a humidity value and determine whether the humidity value exceeds a humidity threshold; and
        drive the one or more fans in response to a determination that any of the received values exceeds its corresponding threshold, the controller being configured to be powered by the battery.

5. The roof of claim 4, further comprising battens interposed between the first and second roofing layers, wherein the battens form the air gap.

6. The roof of claim 4, wherein the solar panel is mounted on the secondary vent member.

7. The roof of claim 4, further comprising a user interface that permits an inhabitant of the building to adjust the thresholds.

8. The roof of claim 7, wherein the user interface is configured to allow the inhabitant to control the fans.

9. The system of claim 1, wherein the controller is configured to receive and process values of two or more environmental parameters from the group consisting of a temperature parameter, a humidity parameter, a toxicity parameter, a moisture parameter, an air flow parameter, and an ambient light level parameter, the controller configured to drive the fans in response to a determination that any one of the received parameter values is not within a predetermined range associated with the environmental parameter having the received parameter value, the system further comprising a user interface permitting an inhabitant of the building to adjust at least some of the ranges associated with the two or more environmental parameters.

10. The system of claim 1, wherein roofing tile elements of the second roofing layer are disposed with downslope edges overlying upslope edges of adjacent roofing tile elements, the downslope edges spaced from the upslope edges of the adjacent roofing tile elements a sufficient distance to create air flow passages between the downslope and upslope edges.

* * * * *